(12) United States Patent
Habenschaden et al.

(10) Patent No.: US 7,443,159 B2
(45) Date of Patent: Oct. 28, 2008

(54) SENSOR UNIT WITH STAGGERED ACTUATION FACES

(75) Inventors: Josef Habenschaden, Kohlberg (DE); Hans-Ludwig Götz, Hahnbach (DE); Thomas Luber, Hahnbach (DE)

(73) Assignee: Cherry GmbH, Auerbach/Opf. (DE)

( * ) Notice: Subject to any disclaimer, the term of this patent is extended or adjusted under 35 U.S.C. 154(b) by 65 days.

(21) Appl. No.: 11/280,822

(22) Filed: Nov. 17, 2005

(65) Prior Publication Data

US 2006/0290346 A1 Dec. 28, 2006

(30) Foreign Application Priority Data

Dec. 17, 2004 (DE) .................. 20 2004 019 489 U
Oct. 18, 2005 (DE) .................. 20 2005 016 333 U

(51) Int. Cl.
*G01B 7/14* (2006.01)
(52) U.S. Cl. ............................... 324/207.24; 324/207.15
(58) Field of Classification Search ............ 324/207.16, 324/207.25, 207.26, 207.15, 207.11, 207.13, 324/207.14, 228, 236, 234, 207.22
See application file for complete search history.

(56) References Cited

U.S. PATENT DOCUMENTS

2003/0169033 A1 9/2003 Tromblee et al.
2006/0132120 A1* 6/2006 Luber et al. ............ 324/207.16

FOREIGN PATENT DOCUMENTS

DE           103 19 720 B3       9/2004
WO    WO 2004/027994 A1       1/2004

* cited by examiner

*Primary Examiner*—Reena Aurora
(74) *Attorney, Agent, or Firm*—Miles & Stockbridge P.C.; David R. Schaffer, Esq.

(57) ABSTRACT

An inductive sensor for detecting the position of a vehicle seat or for a gate shifting unit of an automatic transmission is described. The inductive sensor unit has a plurality of sensor coils that are disposed in planar fashion on a printed circuit board. A conductive actuation element is guided, spaced apart, in a path over the sensor coils and an electrical evaluation circuit detects changes in inductance of the sensor coils in accordance with the path position of the actuation element and converts the changes into electrical signals corresponding to seat position signals on gear shifting signals. The actuation element is guided along the sensor coils with conductive bottom faces that are staggered in the direction of the path.

20 Claims, 10 Drawing Sheets

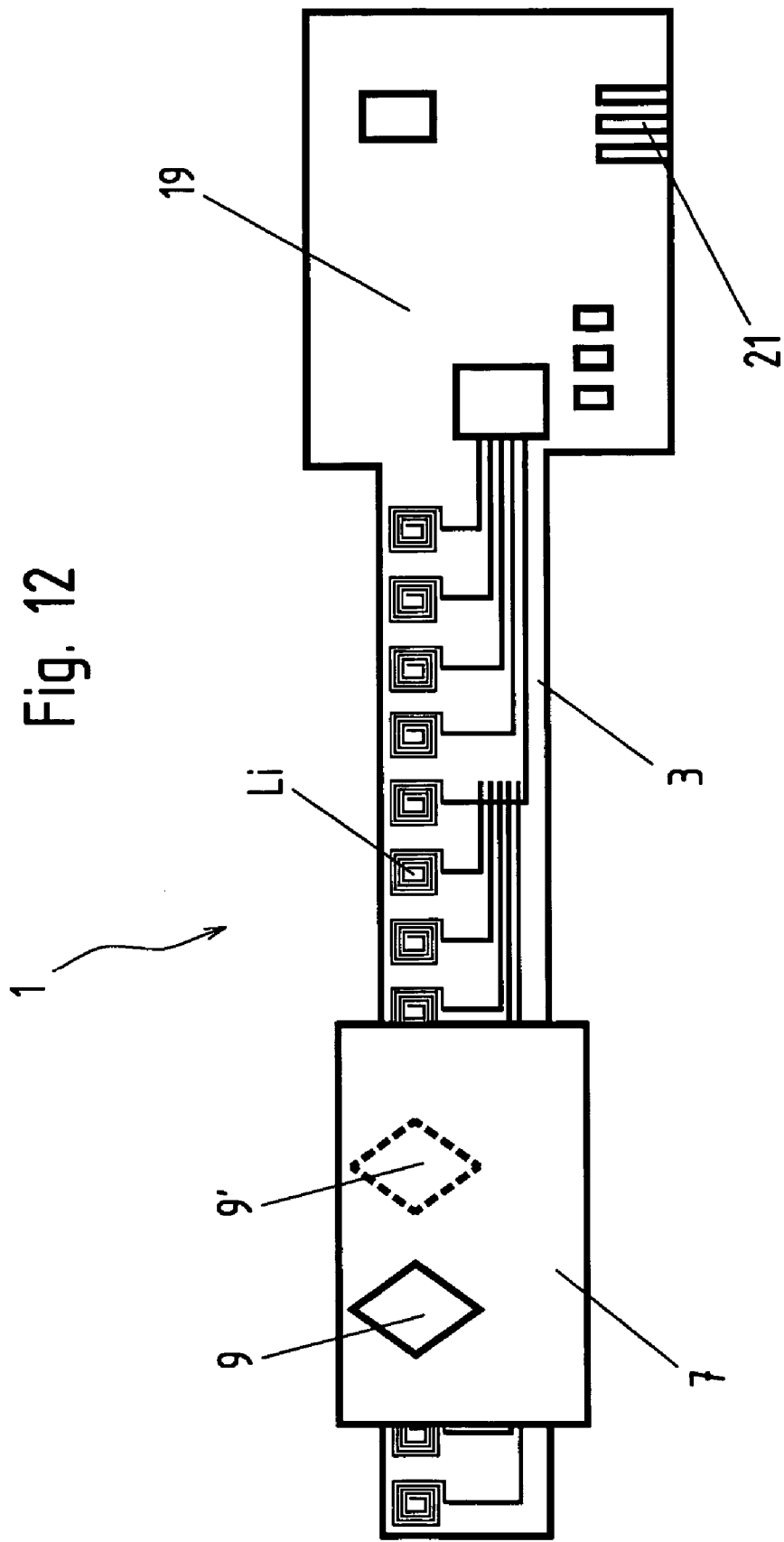

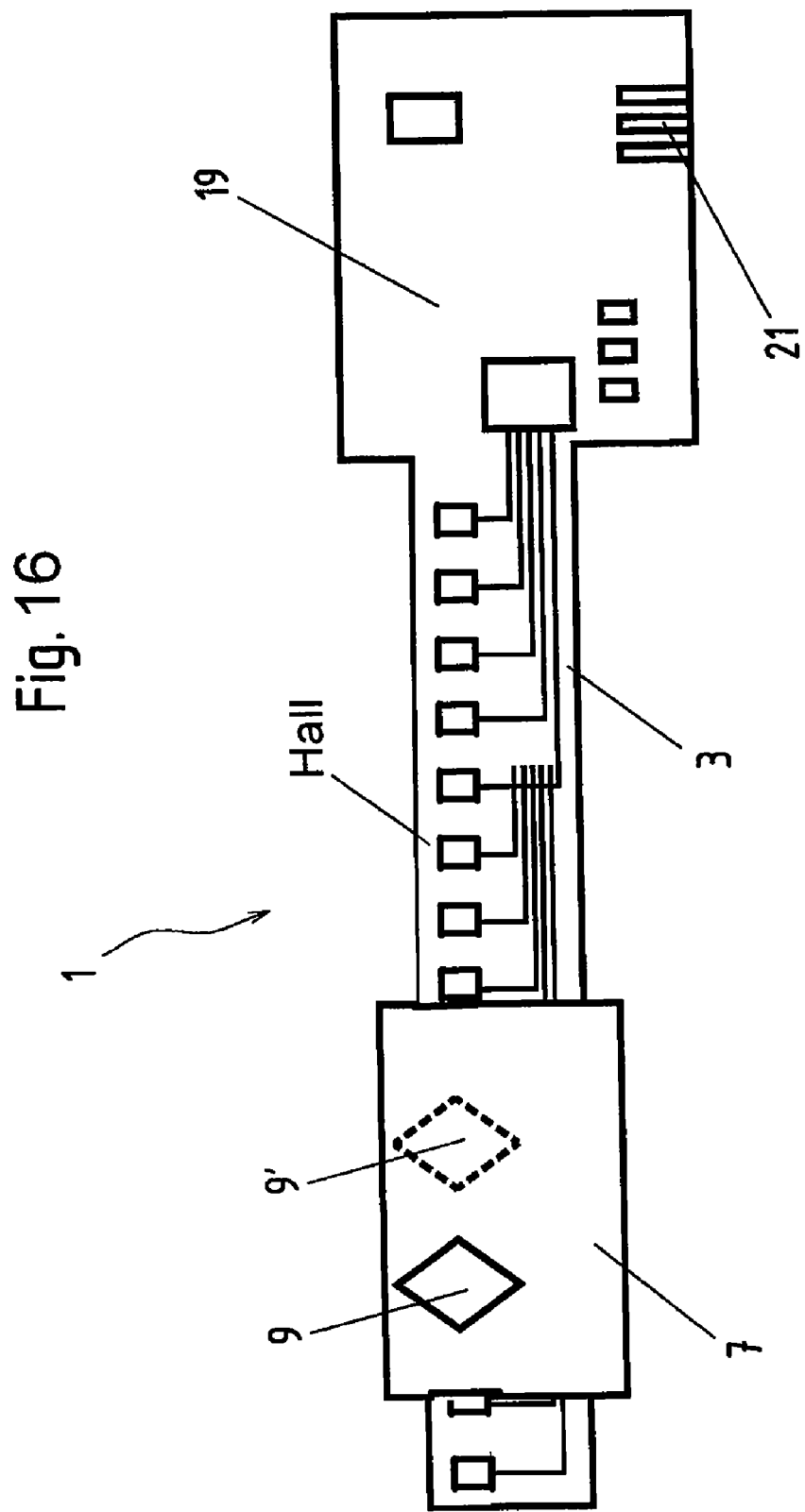

SENSOR UNIT WITH STAGGERED ACTUATION FACES

CROSS REFERENCE TO RELATED APPLICATION

This application is related to application Ser. No. 11/239,643 filed Sep. 20, 2005, for "Inductor Sensor Unit" in the name of Thomas Luber and Hans Ludwig Gotz.

BACKGROUND OF THE INVENTION

1. Field of the Invention

The invention relates to an inductive sensor unit, which is suitable in particular for detecting the position of a vehicle seat or for a gate shift control of an automatic transmission (selector lever module). The field in which the invention is used also includes a travel measurement at spring elements of a chassis.

The invention is embedded in the development of error-tolerant, safer control systems in vehicles, in which electronic cables replace the conventional hydraulic and mechanical connections (X-By-Wire). The invention is especially suitable for tasks of travel measurement in which distances of more than 30 mm are to be determined.

The sensor system described can also be used for angle measurements, for detecting a segment of a circle or a complete revolution. Applications of this in the automotive field are for instance measuring the seatback position or measuring the position of a foot pedal.

DESCRIPTION OF RELATED ART

One such sensor unit, which is the point of departure for the invention, is known from Published International Patent Disclosure WO 2004/027994 A1.

From this prior art it is also known that the travel measurement signals are spacing-dependent; that is, when the actuating element is guided along a path that is curved relative to the plane of the printed circuit board as a result of mechanical tolerances, or if the printed circuit board is not flat, then changes in spacing enter into the measurement signals. The printed circuit board may be curved in a predetermined way, or a large, flat printed circuit board may have unintended curvatures. In the prior art, the spacing dependency is compensated for by scaling and calibration in the electrical evaluation circuit.

Also in the prior art, ascertaining the position of the electrical actuating elements along the path that extends over the plurality of sensor coils is realized such that the changes in inductance of respective adjacent sensor coils are compared with one another. This evaluation enables only a resolution of position in accordance with the grid of the adjacent sensor coils.

From the prior art defined by German Patent DE 103 19 720 B3, a gate shift control unit for generating gear-shifting signals for an automatic transmission of a motor vehicle is known. In this gate shift control unit, a gearshift shaft with a selector lever is supported in a gearshift block. The selector lever can be pivoted in a first plane S, but also perpendicular to it in a second plane T. For that purpose, it is pivotably connected to the gearshift shaft. The motion of the selector lever often corresponds to the positions P, R, N and D, for the Park, Reverse, Neutral, and Drive positions of the selector lever. The selector lever pivots a rotor with a shifting finger, which is accommodated in a modular housing. The shifting finger pivots over a printed circuit board with an inductive sensor unit and represents an exemplary embodiment in which the shifting finger can bear the actuating element, still to be described, of the present invention. Other spatial arrangements and other paths of the conductive actuating element relative to the printed circuit board are equally possible.

From Published US Patent Application US 2003/0169033 A1, a sensor array for contactless position measurement is also known. This sensor array is used to determine the travel position of a vehicle seat. Each sensor element generates an output signal, which correlates with one position from the set of possible seat positions. For the sensors, the Hall effect is employed. For controlling the Hall sensors, either a magnet is provided, which is moved past the sensors, or a magnetic shielding element is provided, which is guided by a magnetic field acting on the sensors. Once again, the signal evaluation allows only a limited resolution of position in accordance with the grid of the adjacent sensors. The invention departs from this prior art defined by the preamble to coordinate claim 17.

The error-tolerant, safer electronic control systems, referred to at the outset, in vehicles demand increased redundance on principle. Some components must be intentionally doubled, to ensure that malfunctions are avoided. For instance, from the inductive selector lever module of WO 2004/027994 A1, it is known to provide two sensor units per shifting position; that is, the printed circuit board is additionally equipped with safety sensor units and with a second actuating element. Similarly, a selector lever module that uses Hall sensors is known, which is equipped with a greater number of Hall sensors such that each position is doubly detected by the sensor system.

SUMMARY OF THE INVENTION

The inductive sensor unit of the present invention has a plurality of sensor coils, which are applied in planar fashion to a printed circuit board. These sensor coils cooperate with a conductive actuating element, which is guided, spaced apart, on a predetermined path along the sensor coils. The conductive actuating element trips changes in inductance in the sensor coils, because of eddy current effects. The inductance of a sensor coil is decreased by the eddy currents all the more, the closer the actuating element is to the sensor coil. The inductive sensor unit also includes an electrical evaluation circuit, which detects these changes in inductance of the sensor coils in accordance with the path position and in accordance with the spacing of the actuating element from the sensor coil and converts them into electrical signals. The electrical signals are in particular seat position signals or gear-shifting signals or chassis suspension signals. Since the sensor represent a considerable proportion of the system costs, an object of the invention is to meet the demands for redundancy, which protect this sensor unit against thew failure of one sensor element, as economically as possible.

This object is attained in that the (conductive or permanent-magnetic) actuating element has two or more bottom faces staggered in the direction of the path of motion, which are guided along the sensors (i.e. is, along the sensor coils or Hall sensors).

In accordance with the present invention the necessary redundancy is provided in the actuating element, instead of the sensors. This will be described below primarily taking as an example an actuating element with conductive damping faces for sensor coils.

Because two or more damping faces are staggered in the path direction, even if one sensor coil fails, the position of the actuating element equipped with more than one damping face can still be ascertained sufficiently precisely.

In accordance with the present invention, the actuating element preferably has two or three staggered bottom faces, which are guided in contactless fashion over the printed circuit board. Depending on the installation space available, the bottom faces may either slide over the printed circuit board on one side or fit in forklike fashion over the printed circuit board. The first option makes for a lesser structural height, while the second option reduces the influence of the spacing between the applicable bottom face and the printed circuit board.

The present invention makes use, among other things, of the fact that by doubling the (as a rule, rhomboid) damping element, the spacing dependence of the measurement signals is reduced, if (i) a unilaterally planar sensor coil is swept over in forklike fashion by the actuating element or (ii) a double-sided planar pair of coils is fashion by the actuating element or (ii) a double-sided planar pair of coils is swept over in forklike fashion and the inductive resistors of the diametrically opposed sensor coils are lined up serially with one another or added together computationally in the evaluation circuit. This provision makes scaling the measurement signals easier, and thus makes the location resolution between adjacent sensor coils more precise. Because of this provision, it can be decided with greater certainty in the evaluation circuit whether the conductive actuating element more likely covers one sensor coil, or the other.

It is also a feature of the invention that the inductances of all the sensor coils—ascertained serially by time-division multiplexing, or parallel—are detected and converted, by means of an algorithm, into a current path position of the measuring element (actuating element). The algorithm may for instance ascertain the local focal point of all the changes in inductance, or in other variant it can calculate a quadratic interpolation along the row of coils. In both variants, the maximum signal distribution reflects the path position of the actuating element more precisely than in the prior art. For instance, with 15 coils, 300 positions of a vehicle seat can be resolved. Simultaneously, such evaluation algorithms also lessen the spacing dependency of the position signal generated, since the various measurement values along the path, each spacing-dependent, become less important in terms of their spacing dependency as a result of the calculation.

The evaluation algorithms also contribute to compensating for the failure of one sensor coil. If one sensor coil (or a pair of coils connected in series) fails at a certain path position, then the missing signal can be replaced by interpolation. This is because the adjacent signals have become more reliable because of the staggered damping faces.

BRIEF DESCRIPTION OF THE DRAWINGS

Exemplary embodiments of the invention will be explained in conjunction with the following drawings.

FIG. 12, the top view on an embodiment of the inductive sensor unit in which two damping faces of the actuating element are staggered in the path direction;

DESCRIPTION OF THE PREFERRED EMBODIMENT

Figure 3:
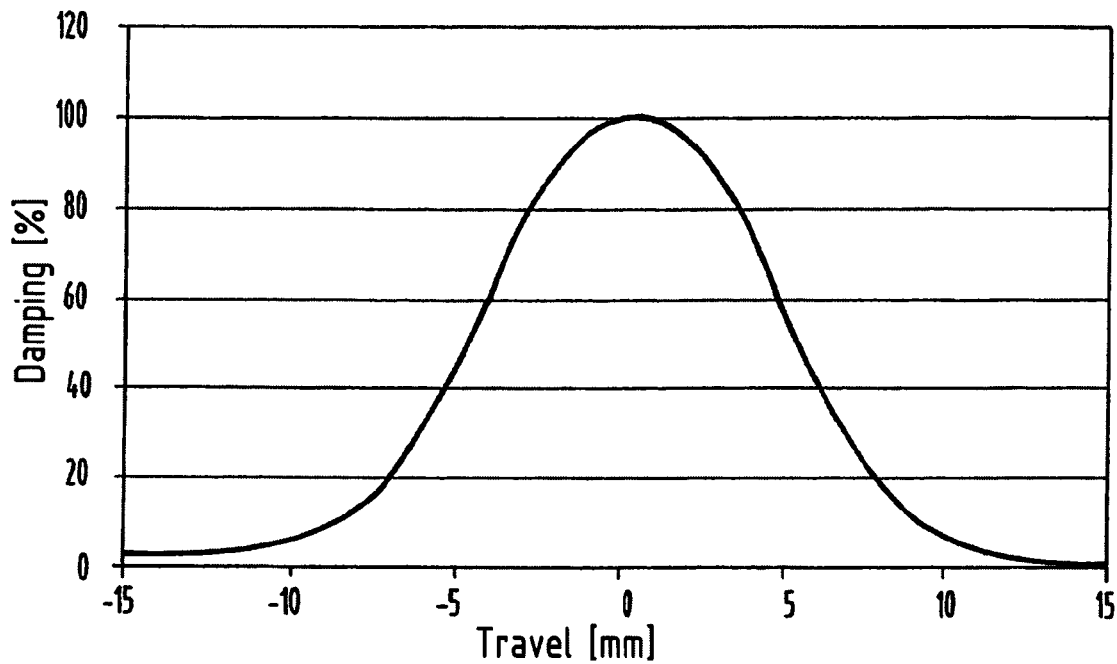
FIG. 3, a graph showing a scaled damping value of a sensor signal, generated by a single coil, as a function of the degree of coverage with which the sensor coil is covered by the actuating element.
Figure 4:
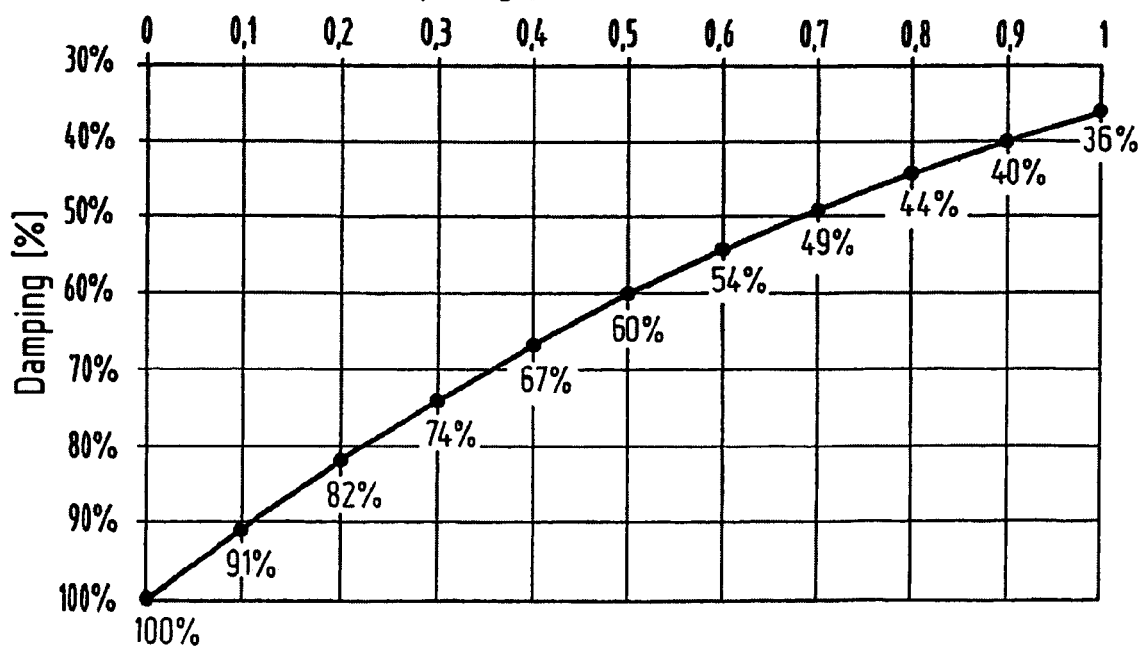
FIG. 4, a graph of the scaled damping value of the sensor signal of FIG. 3 as a function of the spacing between the sensor coil and the actuating element.
Figure 5:
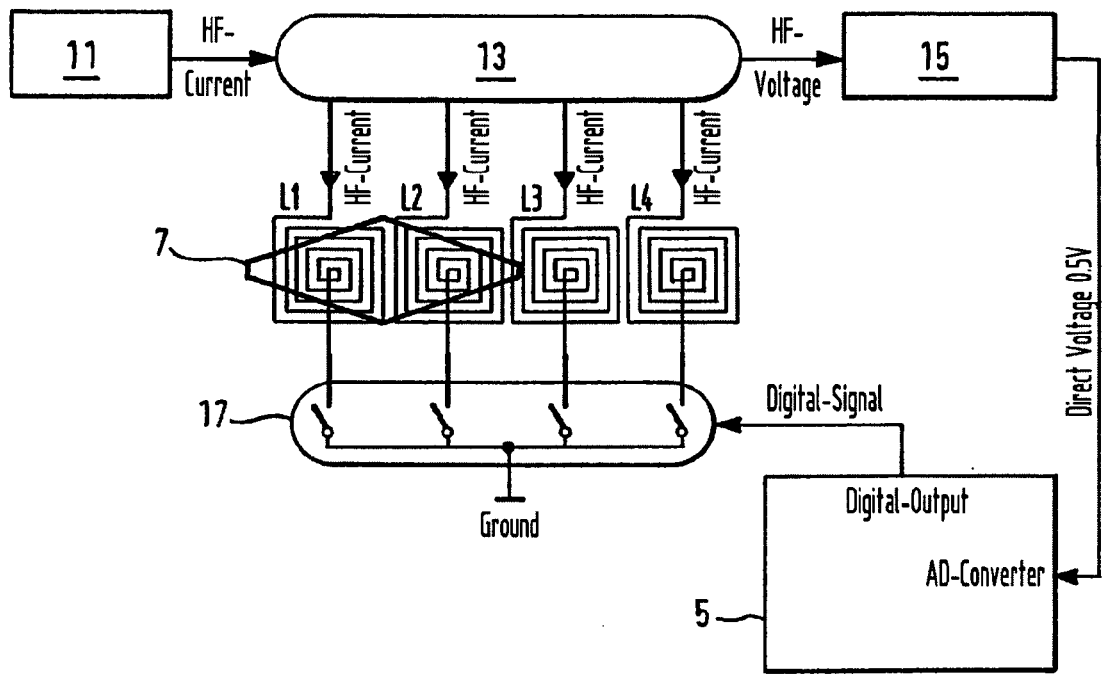
FIG. 5, a hardware concept for measuring the inductive resistance (reactance measurement) of for instance four adjacent sensor coils.

Structurally, the invention is based on a sensor array of the kind described in the prior German Utility Model 20 2004 019 489.9. For better understanding of the general field of the present invention, reference is made accordingly to the following:

the coil arrangements of FIGS. 1, 2, 6, 7, 11a, 11b and 11c;
the damping curves of FIGS. 3, 4, 8, 9 and 10; and
the evaluation circuit of FIG. 5.

Figure 14:
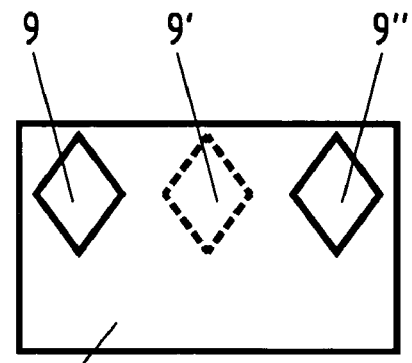
FIG. 14, an actuating element similar to that in FIG. 12, with a third, staggered damping face.
Figure 15:
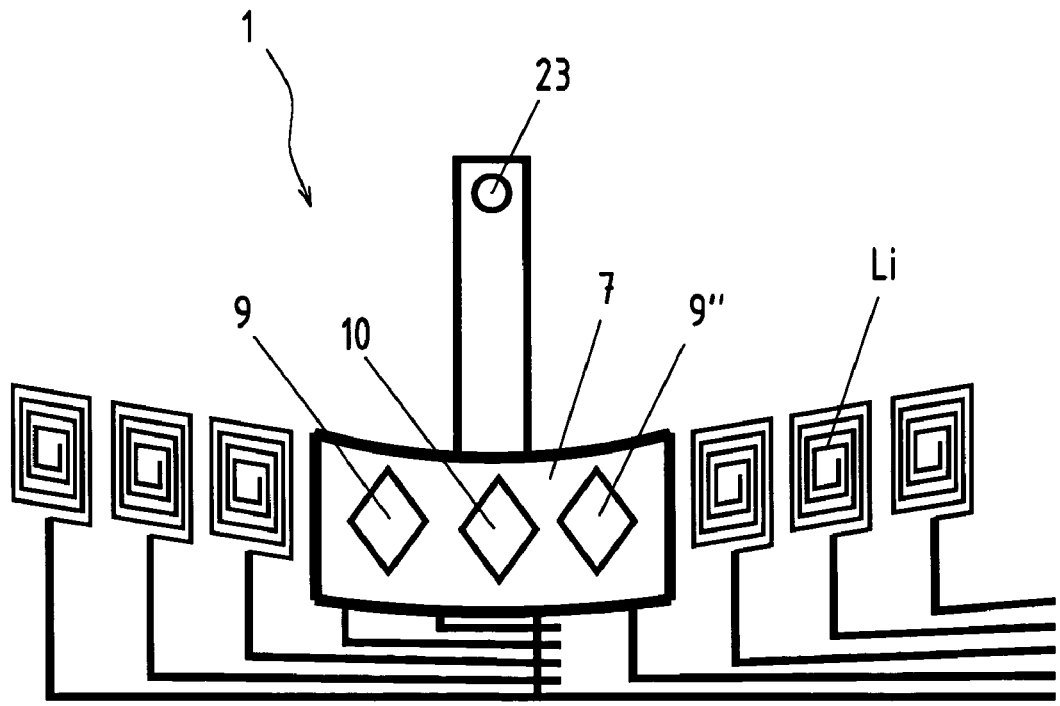
FIG. 15, a plan view on a further form of the inductive sensor unit, in which three staggered damping faces are guided in a circular arc on one side along a curved sensor array.

FIG. 14, an actuating element similar to that in FIG. 12, with a third, staggered damping face;

FIG. 15, a plan view on a further form of the inductive sensor unit, in which three staggered damping faces are guided in a circular arc on one side along a curved sensor array; and FIG. 16, a top view of an embodiment of the Hall sensor unit in which two damping faces of the actuating element are staggered in the path direction.

Figure 1:
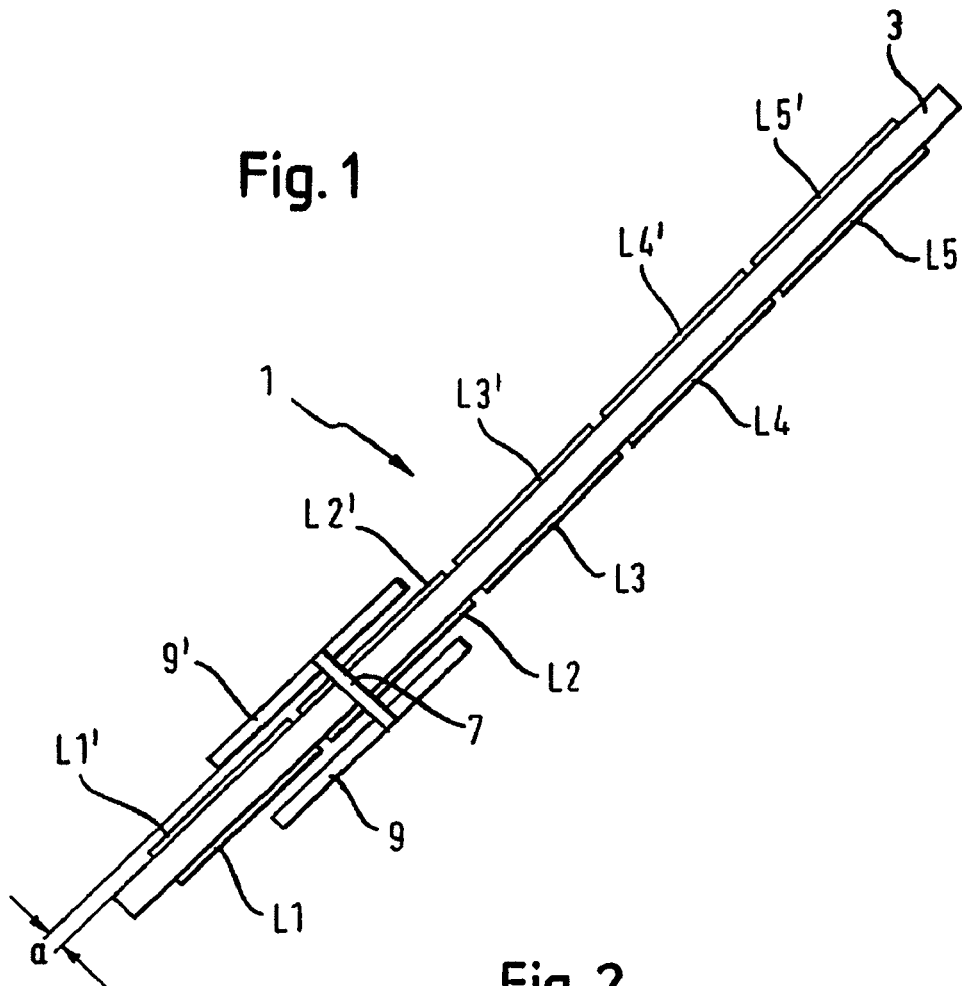
FIG. 1, a side view of a printed circuit board with a plurality of sensor coils, and a top view on a forklike actuating element.

FIG. 1 shows the view of an inductive sensor unit 1. It serves to determine the position of inductor sensors Li accurately. An inductor sensor L is a coil which comprises a plurality of windings of a conductor track on a printed circuit board 3. To increase the inductance, a printed circuit board 3 with multiple layers can be used. The inductance is measured with a suitable electronic circuit, as shown in FIG. 5, for instance. A microcontroller 5 evaluates the voltages measured and from that calculates travel information. If a conductive actuating element 7, in particular a metal plate, is placed on the sensor L, then a lesser voltage is output than in the case where there is no metal plate 7 in the vicinity. The voltages can be scaled such that the high voltage corresponds to a damping value of 0%, and the low voltage corresponds to a damping value of 100% (see FIG. 3).

If a single actuating element 7 is passed over the sensors Li and along this travel path records the damping values, then the curve shape shown in FIG. 3 is obtained. Thus within a certain range, one travel point can be assigned to each damping value as shown in FIG. 3.

However, the curve shape is valid only when the spacing a of the actuator 7 from the sensor Li is constant. If the spacing is changed at a particular position, then the damping value also varies, as shown in FIG. 4. If the spacing a is increased, for instance from 0 mm to 0.1 mm, then the scaled damping changes from 100% to 91%.

Figure 2:
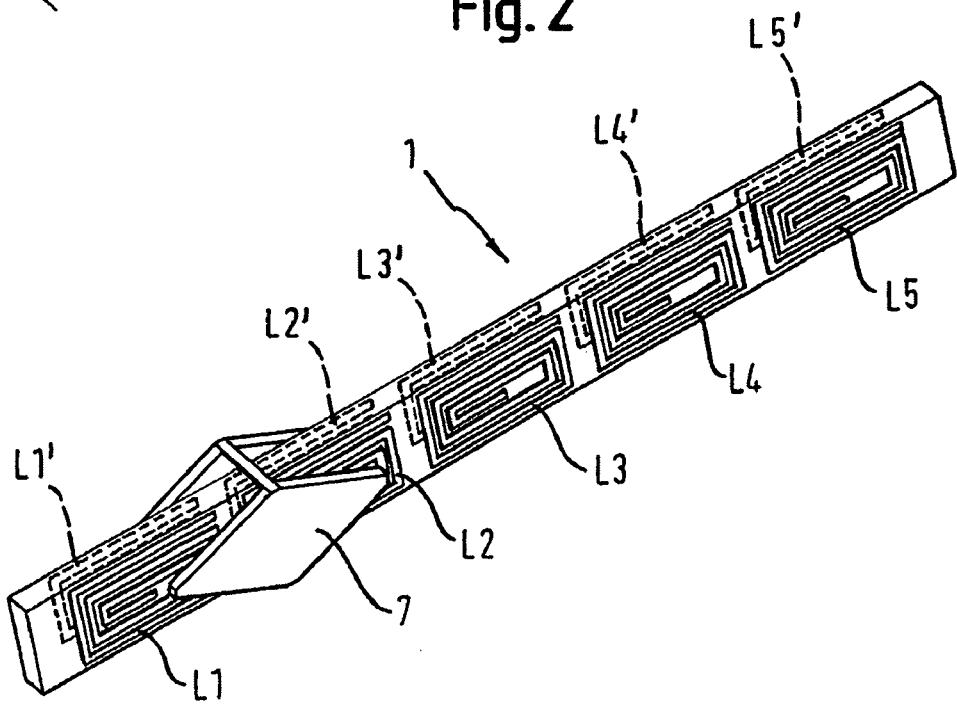
FIG. 2, a perspective view of the printed circuit board, the sensor coils, and the actuating element of FIG. 1.
Figure 11A:
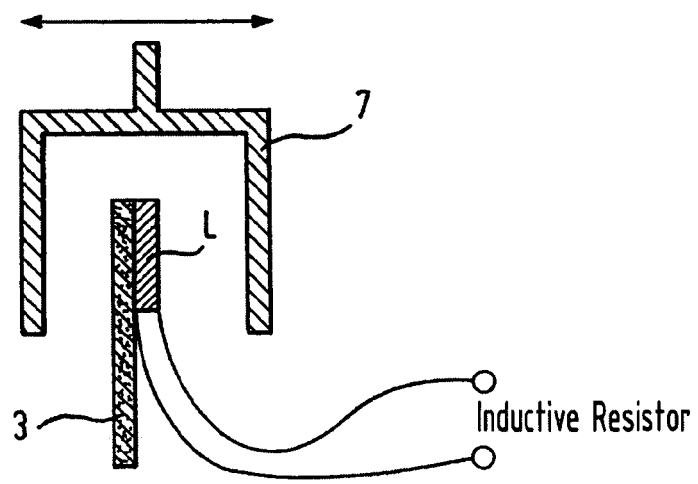
FIG. 11a, an inductive sensor unit of the invention, in which the sensor inductive resistors are mounted on one side of the board.

If a spacing change, which in practice occurs again and again because of mechanical tolerances, is allowed, then an unambiguous association between the sensor signal and the travel becomes more difficult. To eliminate or considerably lessen this effect, a forklike actuator as in FIG. 1 and FIG. 2 is used. FIG. 1 and FIG. 2 also show that the printed circuit board 3 is coated on both sides with sensors Li and Li'. The principle of the forklike actuating element 7, however, is applicable to a printed circuit board 3 coated on only one side as well (see FIG. 11a, compared to FIGS. 11b and 11c).

If in FIG. 1 the spacings a of the two faces 9 and 9' of the forklike actuator 7 have an amount of 0.1 mm, for instance, from both sides of the printed circuit board, then both sensors Li and Li' exhibit a damping of 91% each, or when added together 182%. Thus if the actuator 7 approaches one side of the printed circuit board to a distance of 0 mm (100% damping), then on the other side it moves 0.2 mm away (82% damping). The change in spacing is compensated for by adding the sensor signals. In both cases, the result is a signal value of 182%.

Figure 11B:
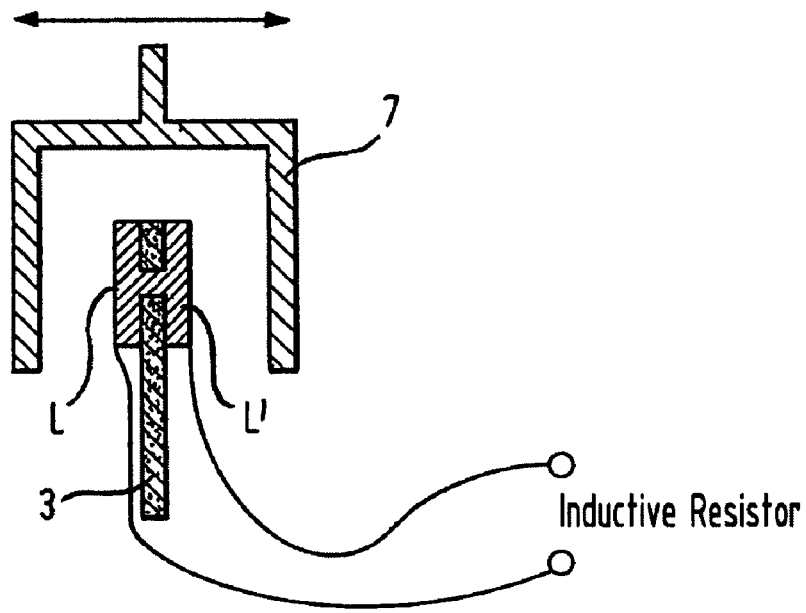
FIG. 11b, an inductive sensor unit of the invention, in which two planar sensor inductive resistors are accommodated on diametrically opposite sides of a printed circuit board and connected in series.
Figure 11C:
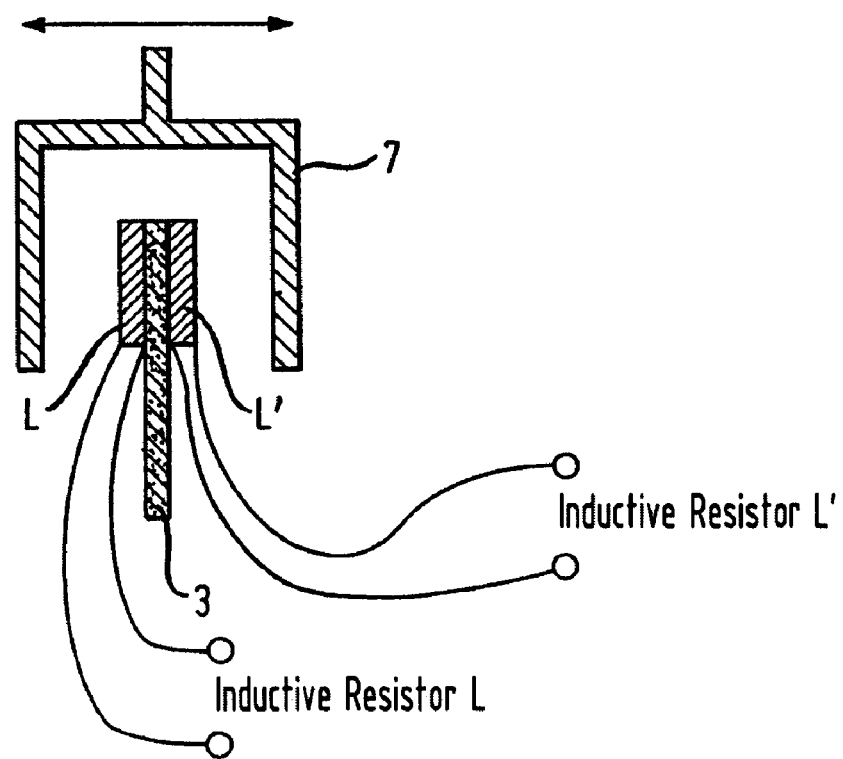
FIG. 11c, an inductive sensor unit of the invention, in which diametrically opposed sensor coils are evaluated separately with regard to their inductance.

Adding together the signals can be done in the microcontroller 5 (see FIG. 11b). However, the two sensors Li and Li' may also be connected in series, so that only one signal is produced (see FIG. 11b). As a result of the series circuit shown in FIG. 11b, the inductances are added together, which has the same effect as adding the signals together.

FIG. 5 shows an embodiment concept for the sensor unit 1 of the invention. A sine wave oscillator 11 generates an alternating current of constant amplitude and constant frequency (for instance, f=12 MHz). This high-frequency alternating current is amplified at 13 and fed in successively (multiplexer 17) into one each of the sensor coils L1, L2, L3, L4. In FIG. 5, as an example, four sensor coils L1-L4 are shown, while in FIGS. 7, 8 and 9, 15 sensor coils L1-L15 are for instance shown. The number of sensor coils depends on the measurement range, the required resolution, and the required fail-safe level, in conjunction with the selectivities of the actuating element 7 and of the evaluation algorithm.

If an actuating element 7, which comprises highly conductive material, such as copper or brass, is moved over the coils L1-L4, then the inductance L of the coils decreases because of eddy current losses. As a result, the inductive resistance (reactance) of the coils decreases in proportion. If the actuator 7 is located with its center point above a center of a coil, then the coil Li has a maximum damping. The minimum inductive resistance causes a minimal voltage drop (when current is impressed).

The voltage drop at the coils L1-L4 is rectified at 15 and delivered to a microcontroller 5 for further processing. Work can be done in a known manner with impressed voltage as well, or with mistuning of resonant circuits.

Figure 6:
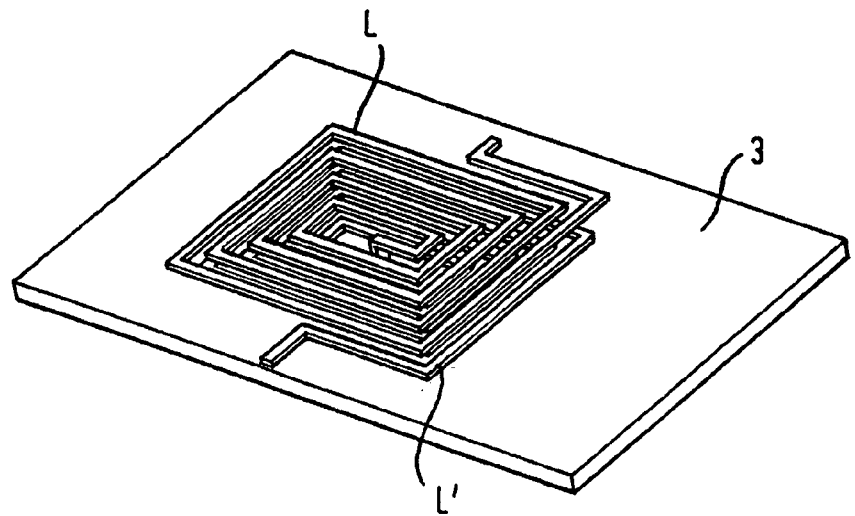
FIG. 6, a perspective view of a circuit substrate (in particular a printed circuit board) and the makeup of a coil mounted on two sides in planar fashion and connected in series.

One example of a makeup of a sensor coil L is shown in FIG. 6. The parameters selected are not fixed variables; they are intended solely for purposes of illustration. The coils L and L' are located on a circuit-carrying substrate (such as a printed circuit board 3 or an equivalent circuit-carrying substrate) and are disposed in planar fashion on both sides. They are connected electrically to one another (see FIG. 11b) and have a helical winding direction. As a result of this arrangement, the number of windings increases, and the consequence is higher inductance.

Figure 7:
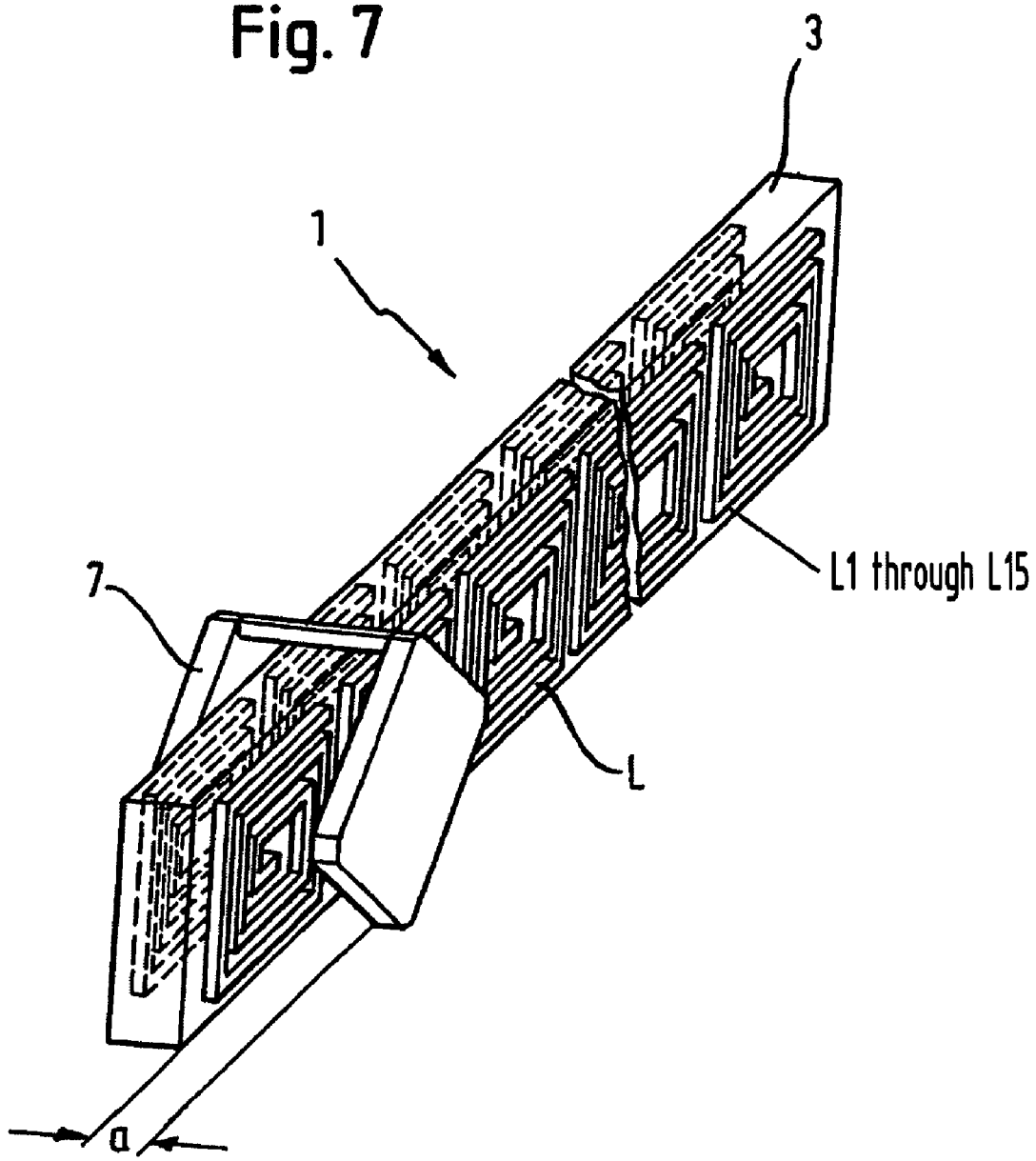
FIG. 7, a perspective view of the makeup of an inductive sensor unit with for instance 15 coils on both sides and a forklike double actuator.

From these elements, an inductive sensor unit 1 as shown in FIG. 7 can be constructed. In this exemplary embodiment, there are 15 coils L1-L15 on the circuit-carrying substrate 3. The geometrical dimensions of the coils depend on the desired inductance and on the material. For a rectangular coil L measuring 25 mm×10 mm and having 40 windings, an inductance of approximately 14 µH is obtained. The coils Li are disposed side by side and have a spacing of 25 mm. The coils are damped by a rhomboid double actuator 7 as shown in FIG. 7 (see also FIG. 2).

If a sensor Li is not covered by the actuator 7, then the damping is 0%; for a fully covered sensor Li, it is 100% (see FIG. 3). The damping is also dependent on the spacing a of the actuator 7 from the sensor coils Li; if the spacing a increases, the maximum damping decreases, as can be seen from FIG. 4.

Figure 8:
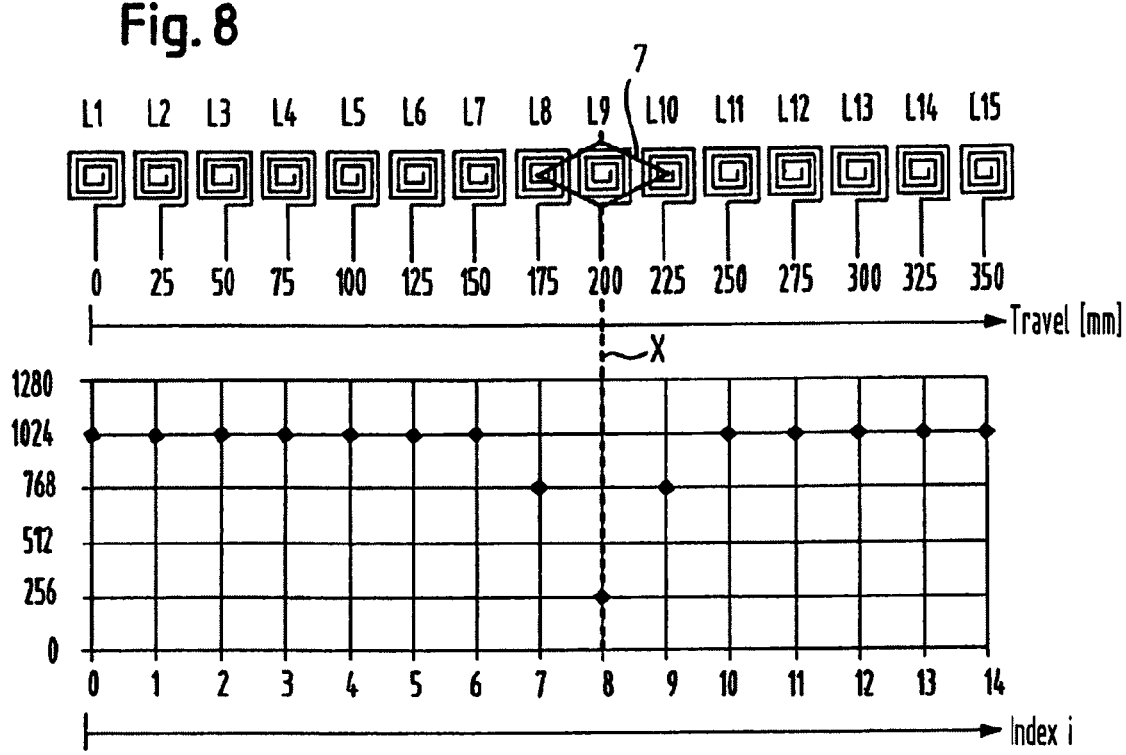
FIG. 8, a graph showing the voltage signal values of the 15 coils of FIG. 7 as a function of the index of the 15 coils, or as a function of the travel distance of the actuating element along the 15 coils.
Figure 9:
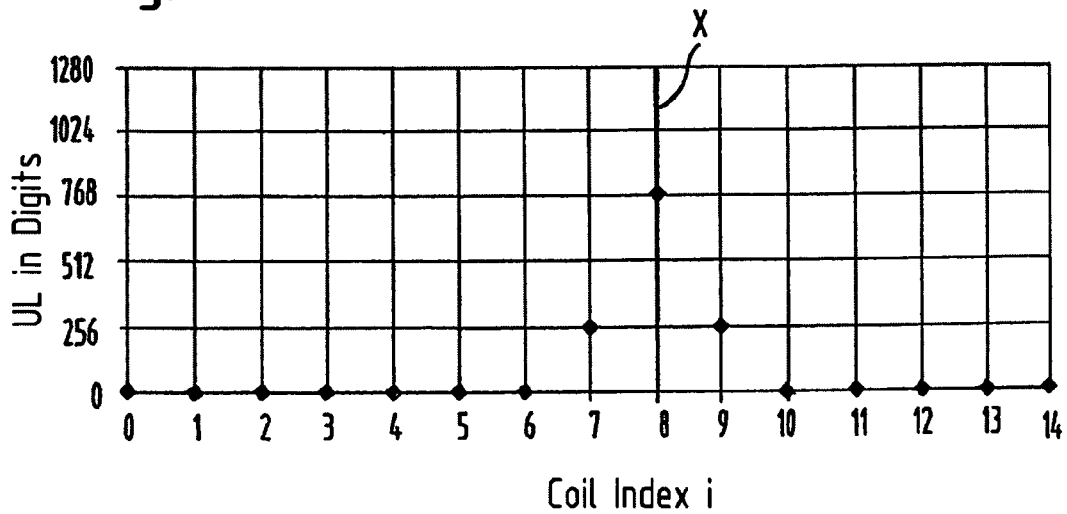
FIG. 9, a graph is which the voltage values shown in FIG. 8 are converted, by a zero scaling into values that are suitable for the use of a focal point formula.

By means of the double actuator 7 of FIG. 7, a spacing deviation is compensated for, and the damping is kept constant, given calibrated evaluation. The signal evaluation is shown in FIGS. 8 and 9. As an example, the actuator 7 is located at a 200 mm travel mark.

The microcontroller 5 cyclically, at fixed time intervals, measures the voltages of the sensors L1-L15, which are proportional to their inductances. These voltages are converted in the microcontroller 5 into binary values and are stored in a memory with a running index 0-14. In FIG. 8, the measured voltages are shown as a function of the index 0-14.

In the next step, a zero scaling is performed as shown in FIG. 9. This is done in that the microcontroller 5, from the points in FIG. 8, ascertains the sensor signal having the highest voltage (the highest binary value). In this example, this is the binary number 1024. After that, the highest voltage is subtracted from each of the 15 sensor values. The scaled graph can be seen in FIG. 9.

In practice, in detecting signals of the coils Li, noise occurs. The coils Li without damping do not have an entirely constant value. This noise can be suppressed by taking into account only the three lowest voltage values, for instance, and performing the zero scaling of FIG. 9 with the maximum of these three voltages.

Figure 10:
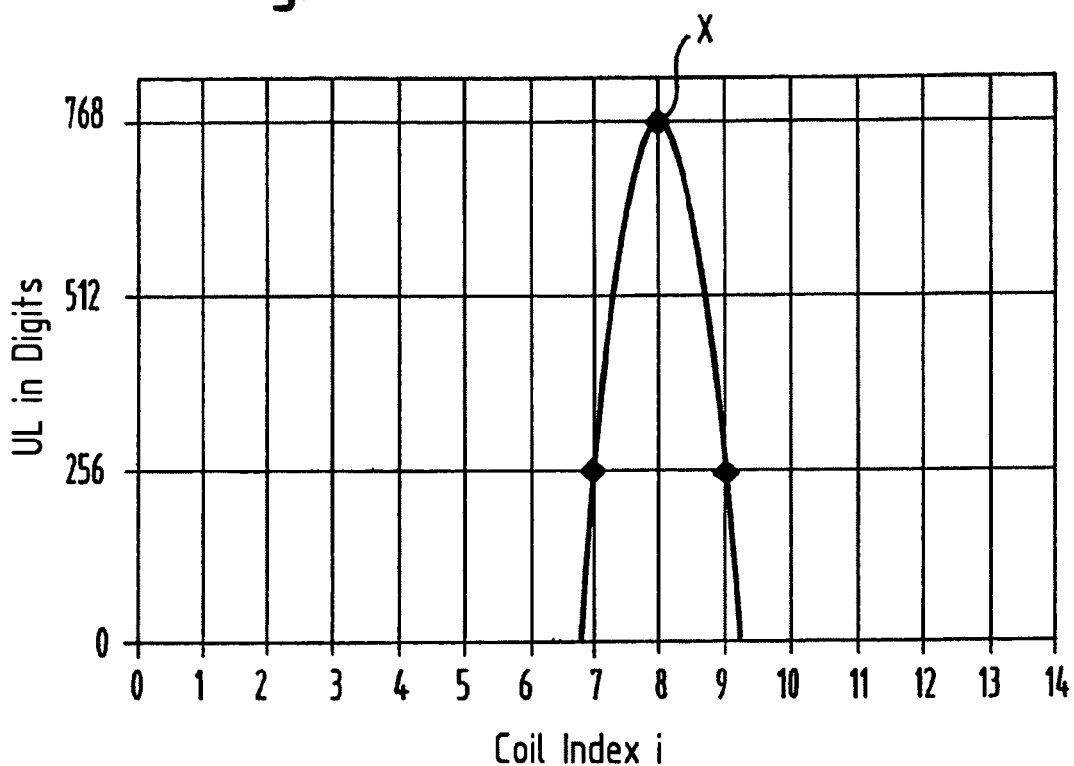
FIG. 10, alternatively to the focal point calculation of FIG. 9, a quadratic interpolation of the scaled signals with the aid of a parabola.

Another possibility for position detection is interpolation with a quadratic function through three points, as shown in FIG. 10. To that end, after the zero scaling, the maximum value of the parabola is sought. In this example, the maximum has the numerical value 768 and is located at the index coil 8. As the second and third points, the value to the left and to the right, respectively, of the maximum is needed in order to perform the interpolation. In this example, the voltage to the left of the maximum has the numerical value 256 and is located at the index coil 7, while the numerical value to the right of the maximum is 256 and is located at the index coil 9. The interpolation can be done using known mathematical algorithms. The three points in the graph of FIG. 10 and the interpolation parabola show that the apex of the parabola is the position sought for the actuating element 7.

Figure 13:
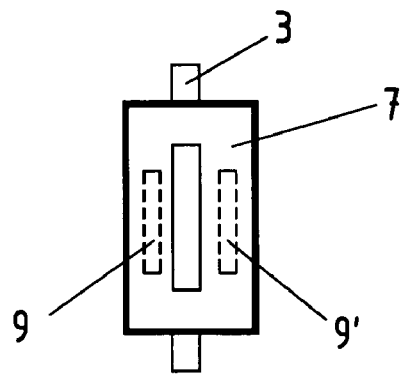
FIG. 13, a side view of the embodiment of FIG. 12.

A modification according to the invention of the forklike actuating element 7 will now be explained in conjunction with FIGS. 12 and 13; its two rhomboid damping faces 9, 9' are staggered here in the direction of the path of motion. Once again, the actuating element 7 slides in contactless fashion over the linear array of sensor coils Li. The sensor coils Li are applied to a printed circuit board 3 or to a comparable circuit-carrying substrate of plastic. The coil signals reach an electronic evaluation unit 19, which may be located on the same printed circuit board 3. The electronic evaluation unit 19 comprises transistors, resistors, and capacitors, which for instance form the structural groups 13, 15 and 17 of FIG. 5. Via a serial interface 21, the sensor signals are carried on to the A/D converter of the microcontroller 5 (which can be seen in FIG. 5). These sensor signals are in the form of analog direct voltages, but may also be pulse-width-modulated in analog form.

One of the sensor coils Li, or individual components of the electronic evaluation unit 19, may fail under some circumstances. In that event, the invention provides a remedy. The damping faces 9 and 9' of the actuating element 7 are located facing one another; that is, the actuating face 9 is shifted on the surface of the printed circuit board 3, and the actuation face 9' is shifted on the underside of the printed circuit board (as FIG. 13 shows). As a result of this disposition in two planes, the mechanical tolerances, which cause changes in the spacing of the damping faces 9, 9', can be compensated for.

On the other hand, FIG. 12 shows an staggered of the damping faces 9, 9' in the path direction. The position of the actuating element 7, which is doubled here, is ascertained by computation. Since each sensor signal is measured in analog fashion, intermediate positions can also be detected with high resolution. Because two staggered damping elements 9, 9' are used, the position can still be ascertained with sufficient precision even if one sensor coil, or the electronic components belonging to it, should fail. For instance, if the damping face 9 meets a failed sensor coil, then an intact sensor coil experiences maximum damping by means of the remaining damping face 9'.

In the embodiment of FIG. 14, compared to FIG. 12, a third staggered damping face 9" on the actuating element 7 is added. The result is an arrangement with two damping faces 9 and 9" in one plane and one damping face 9' located above them. The algorithms for determining the path position x (see for example in FIG. 10) have enough selectivity to calculate the path position x sought, even from incomplete sensor signals.

FIG. 15 compared to FIG. 14 shows two modifications, which can be made individually or jointly.

Three staggered damping faces 9, 10 and 9" are located in one plane on the top side of the actuating element 7. This arrangement is advantageous if the spacing tolerances do not play any role, or if the underside of the printed circuit board 3 needs to remain free.

Also in FIG. 15, the sensor coils Li are lined up in a circular arc, and the actuating element 7 is guided over the sensor coils Li pivotably about an axis 23 of rotation. With this characteristic, the redundant sensor principle described is also suitable for angle measurements. In FIG. 15, a segment of a circle can be detected; however, a full revolution of the actuating element 7 is also possible. This can be employed in the automotive field for instance in measuring the angle of the seatback position or of the gas pedal.

In FIG. 15, the actuating element 7 is curving, matching the curved arrangement of coils Li, and has rhomboid damping faces 9, 10. For major curvatures, better results, or in other words damping curves that mesh with one another better, are obtained with round or circular damping faces.

For linear motions, the actuating element 7 has conductive damping faces 9, which are expediently rhomboid. Each rhomboid damping face 9 preferably has a length in the path direction by which three coils Li are damped simultaneously (see FIG. 8). For instance, the damping region of the fourth coil L4 adjoins the damping region of the first coil L1. Moreover, the width dimension of the rhombus is adapted such that the course of damping of a coil, with a good approximation, is similar to a parabola. Because of the resultant superposition of three parabolas per rhombus, the computational interpolation is reinforced toward a fictive parabola whose apex is located at the travel mark x on the rhombus.

If two rhombuses 9, 10 are staggered in the path direction, for instance by the distance between two coils L8 and L10, then the damping action extends over five coils. Then the quadratic interpolation of FIG. 10 can be based on five measurement values, so that the failure of one coil measurement value can not only be detected securely but also bridged by programming.

All the structural properties and characteristics of the invention can also be realized with a series of Hall sensors instead of a series of sensor coils Li. In that case, the actuating element 7 has bottom faces 9 of permanent-magnetic material, and the electronic evaluation unit 19 in this case is suitable in a known way for processing the Hall sensor signals. The term "permanent-magnetic actuating element" is understood to be either a movable permanent magnet or a magnetic shielding element that is passed through the field of a fixed permanent magnet.

In a known electronic selector lever module, at present 20 Hall sensors are used, and each switching position is detected doubly, for safety reasons. With the principle of the staggered actuating element, the number of Hall sensors can be reduced to 10, and in the least favorable case to 12. The sensor positions, it is true, are then only singly occupied, but an adjacent sensor receives a maximum signal because of the staggered face 9'. Since the sensors make up a considerable proportion of system costs, the provisions of the invention make for a marked cost reduction.

List of Reference Numerals

L Inductive sensor
L' Opposed inductive sensor
L1 First inductive sensor
Li $i^{th}$ inductive sensor
i Coil index
a Spacing
x Travel mark of the focal point
1 Inductive sensor unit
3 Printed circuit board
5 Microcontroller
7 Conductive actuating element
9, 9', 9" Rhomboid bottom faces, damping faces
10 Staggered damping face
11 Sine wave oscillator
13 Current amplifier and current-to-voltage converter
15 HF rectifier
17 Multiplexer
19 Electronic evaluation unit
21 Interface
23 Axis of rotation

What is claimed is:

1. An inductive sensor unit (1), which detects the position of a vehicle seat, said unit having:
   a plurality of sensor coils (L1 . . . Li) disposed in planar fashion on a printed circuit board (3), and
   a conductive actuating element (7), adapted to be guided in, spaced apart relationship (a), on a path along the sensor coils (L1 . . . Li), said conductive actuating element having conductive bottom faces and an electrical evaluation circuit (5, 11-17; 19), which detects changes in inductance of the sensor coils (L1 . . . Li) in accordance with a path position (x) of the actuating element (7) and which converts the changes into electrical signals into seat position signals,
   wherein the actuating element (7) is guided along the sensor coils (L1 . . . Li) with conductive bottom faces (9, 9', 9", 10) that are staggered in the direction of the path.

2. The inductive sensor unit (1) in accordance with claim 1, wherein the conductive actuating element (7) further includes two bottom faces (9, 9') spaced apart on both sides, and disposed in forklike fashion over the printed circuit board (3).

3. The inductive sensor unit (1) in accordance with claim 2, wherein the conductive actuating element (7) further includes a further bottom face (9"), and disposed in forklike fashion over the printed circuit board (3).

4. The inductive sensor unit (1) in accordance with claim 1, wherein the conductive actuating element (7) is guided along the printed circuit board (3) by at least two (9, 10) bottom faces, which are spaced apart on one side.

5. The inductive sensor unit (1) in accordance with claim 1, wherein the conductive actuating element (7) has rhomboid bottom faces (9, 9', 9", 10) on at least one side of the printed circuit board (3).

6. The inductive sensor unit (1) in accordance with claim 1, wherein the printed circuit board (3) is flat.

7. The inductive sensor unit (1) in accordance with claim 1, wherein the printed circuit board (3) is curved.

8. The inductive sensor unit (1) in accordance with claim 1,
   wherein the plurality of sensor coils (L1 . . . Li) is lined up linearly on the printed circuit board (3), and
   the actuating element (7), for travel measurement, is guided on a straight path along the sensor coils (L1 . . . Li).

9. The inductive sensor unit (1) in accordance with claim 1,
   wherein the plurality of sensor coils (L1 . . . Li) is lined up in a circular arc on the printed circuit board (3), and
   the actuating element (7) is guided pivotably about a pivot axis (23) along the sensor coils (L1 . . . Li) for angle measurement.

10. The inductive sensor unit (1) in accordance with claim 1, wherein the plurality of planar sensor coils (L1 . . . Li) is mounted on one side (sensor L) of the printed circuit board (3).

11. The inductive sensor unit (1) in accordance with claim 10, wherein the plurality of sensor coils (L1 . . . Li) is mounted on another side (L') of the printed circuit board (3).

12. The inductive sensor unit (1) in accordance with claim 11, wherein two sensor coils (L, L'), are located in planar fashion diametrically opposite one another on opposite sides of the printed circuit board (3), and are connected in series.

13. The inductive sensor unit (1) in accordance with claim 11, wherein two sensor coils (L, L'), are located in planar fashion diametrically opposite one another on opposite sides of the printed circuit board (3), such that their measurement signals are added together in an evaluation circuit (5, 11-17).

14. The inductive sensor unit (1) in accordance with claim 1, wherein the electrical evaluation circuit (19) includes at least one resonant circuit, whose resonant frequency is jointly determined by the inductance of the sensor coils (L1 . . . Li).

15. The inductive sensor unit (1) in accordance with claim 1, wherein the electrical evaluation circuit (5, 11-17) measures reactance of the sensor coils (L1 . . . Li) upon current impression (11, 13).

16. The inductive sensor unit (1) in accordance with claim 1, wherein the electrical evaluation circuit (19) measures reactance of the sensor coils (L1 . . . Li) upon voltage impression (11, 13).

17. A Hall sensor unit (1), which detects the position of a vehicle seat, said unit having:
   a plurality of Hall sensors, which are mounted on a printed circuit board (3),
   a permanent magnet actuating element (7), which is guided on a path along the Hall sensors, and
   an electrical evaluation circuit (19), which detects signal changes of the Hall sensors in accordance with a path position (x) of the actuating element (7) and which converts said signal changes into electrical seat position signals,
   wherein the permanent-magnetic actuating element (7) is guided, spaced apart on both sides (9, 9'), and with bottom faces (9, 9', 9", 10) staggered in the direction of the path, along the Hall sensors.

18. The Hall sensor unit (1) in accordance with claim 17, wherein the plurality of Hall sensors is applied on both sides of the printed circuit board (3).

19. The Hall sensor unit (1) in accordance with claim 17, wherein the electrical evaluation circuit (19) detects the signals of all Hall sensors and converts said detected signals, using an algorithm, into a current path position (x) of the actuating element (7).

20. The Hall sensor unit (1) in accordance with claim 18, wherein the electrical evaluation circuit (19) detects the signals of all Hall sensors and converts said detected signals using an algorithm into a current path position (x) of the actuating element.

* * * * *

UNITED STATES PATENT AND TRADEMARK OFFICE
CERTIFICATE OF CORRECTION

PATENT NO. : 7,443,159 B2
APPLICATION NO. : 11/280822
DATED : October 28, 2008
INVENTOR(S) : Josef Habenschaden, Hans-Ludwig Gotz and Thomas Luber It is certified that error appears in the above-identified patent and that said Letters Patent is hereby corrected as shown below:

Column 9, Line 51 – Delete "planar".

Signed and Sealed this

Tenth Day of February, 2009

JOHN DOLL
*Acting Director of the United States Patent and Trademark Office*